Patented Oct. 16, 1951

2,571,150

UNITED STATES PATENT OFFICE 2,571,150

SEED FOR PRODUCTION OF TITANIUM DIOXIDE AND METHOD OF MAKING SAME

Max J. Mayer, Scarsdale, N. Y.

No Drawing. Application September 2, 1949, Serial No. 113,905

11 Claims. (Cl. 23—202)

The present invention relates to the production of titanium dioxide and has particular reference to a seed for the preparation of titanium dioxide.

Many methods have been proposed for the preparation of nuclear dispersions of materials to induce rutilization when used in the hydrolysis of titanium sulfate and other solutions and the hydrolysate calcined. The dispersing media for these seed dispersions are monobasic acids, for example HCl. Titanium dioxide is generally proposed as the seeding agent, but tin dioxide and other oxides of the metals of the fourth group have been suggested. Among the patents which describe such nuclear dispersions may be mentioned United States Patents Nos. 2,062,133; 2,285,485; 2,285,486; 2,301,412; 2,303,305; 2,303,306 and 2,305,307 and British Patents Nos. 405,669 and 533,227.

In most of the prior art practice, concentration of $TiO_2$ in the seed dispersion is relatively low; that is, 20 g./l. $TiO_2$ or less. Also, most of the prior art is founded upon and recommends the use of relatively large quantities of seed for hydrolysis; that is from 8 to 20% of the $TiO_2$ content of the hydrolysis solution. Such seed dispersions in the quantities recommended consequently require large volumes of the seed dispersions for hydrolysis, thus rendering the operation cumbersome and costly.

Among the objects of this invention is the preparation of improved nuclear dispersions of seed for hydrolysis of titanium salt solutions, utilizing the beneficial effects of stabilizers according to my discovery.

A further object of my invention is the preparation of nuclear seed dispersions in much higher concentrations than heretofore as well as in dilute state that will serve effectively and efficiently for hydrolysis of titanium salt solutions whether such seed dispersions are employed therefor immediately or substantially long periods after preparation.

Another object of this invention is to prepare stabilized nuclear dispersions of seed from salts of titanium or other metals of the fourth group and a monobasic acid.

Other, further and more specific objects of this invention will become readily apparent to persons skilled in the art from a consideration of the following description, including specific examples.

When dispersions containing 20 g./l. $TiO_2$, or more, are formed without stabilizing agents, precipitates form on standing and at the higher concentrations the seed dispersions must be employed almost immediately after preparation in order to utilize their initial efficiency. By using stabilizing agents with dispersions of these concentrations of $TiO_2$, the need for immediate use of the dispersions after their preparation is overcome.

In practising this invention, the aforesaid nuclear dispersions of seed are prepared by utilizing stabilizers of monobasic organic carboxylic acids which are soluble in dilute HCl. These stabilizers disappear during calcination as such or are decomposed into volatile products during calcination.

The following examples are illustrative of my invention:

Example I

Titanium hydrate is precipitated from a pure titanium sulfate liquor with a sodium carbonate solution at a pH of 8. The resulting hydrate is washed until the filtrate shows no precipitate with $BaCl_2$. The washed hydrate is then peptized with HCl to form a sol containing 45 g./l. $TiO_2$ and 27 g./l. HCl. To this sol is added acetic acid equal to 2% by weight of the $TiO_2$ content and then cured by heating to 70° C. to boiling, preferably to 90° C. in 15 minutes, and holding at this temperature for 10 minutes to develop the nuclear properties, and then immediately cooling below 60° C., preferably below 50° C.

Example II

Formic acid equal to 4% of the $TiO_2$ content is employed as the stabilizer in lieu of acetic acid. The sol contains 60 g./l. $TiO_2$ and 36 g./l. HCl.

Example III

Propionic acid equal to 2.5% of the $TiO_2$ content is used for the stabilizing agent. The sol contains 30 g./l. $TiO_2$ and 24 g./l. HCl.

Example IV

The stabilizer is either butyric acid or isobutyric acid equal to 3% of the $TiO_2$ content. The sol contains 80 g./l. $TiO_2$ and 56 g./l. HCl.

Example V

Glycolic acid equal to 2.5% of the $TiO_2$ content serves as the stabilizing agent. The sol contains 20 g./l. $TiO_2$ and 15 g./l. HCl.

Example VI

Lactic acid equal to 2.5% of the $TiO_2$ content is employed as the stabilizer. The sol contains 50 g./l. $TiO_2$ and 30 g./l. HCl.

Example VII

The stabilizer is gluconic acid equal to 6% of the $TiO_2$ content. The sol contains 60 g./l. $TiO_2$ and 45 g./l. HCl.

Example VIII

Meta-nitrobenzoic or para-nitrobenzoic acid equal to 4% of the $TiO_2$ content is employed as the stabilizer in lieu of acetic acid. The sol contains 30 g./l. $TiO_2$ and 15 g./l. HCl.

Example IX

Mandelic acid equal to 3% of the $TiO_2$ content is used for the stabilizing agent. The sol contains 60 g./l. $TiO_2$ and 36 g./l. HCl.

Example X

Anthranilic acid equal to 4% of the $TiO_2$ content serves as the stabilizing agent. The sol contains 40 g./l. $TiO_2$ and 20 g./l. HCl.

Example XI

The stabilizer is salicylic acid equal to 7% of the $TiO_2$ content. The sol contains 70 g./l. $TiO_2$ and 45 g./l. HCl.

Example XII

Gallic acid equal to 10% of the $TiO_2$ content is employed as the stabilizing agent. The sol contains 60 g./l. $TiO_2$ and 40 g./l. HCl.

Example XIII

Leucine equal to 6% of the $TiO_2$ content is used as the stabilizer in lieu of acetic acid. The sol contains 60 g./l. $TiO_2$ and 40 g./l. HCl.

Example XIV

The stabilizer is tyrosine equal to 8% of the $TiO_2$ content. The sol contains 30 g./l. $TiO_2$ and 20 g./l. HCl.

Example XV

Arginine equal to 3% of the $TiO_2$ content is employed as the stabilizing agent. The sol contains 70 g./l. $TiO_2$ and 50 g./l. HCl.

Example XVI

The stabilizing agent is lysine equal to 12% of the $TiO_2$ content. The sol contains 45 g./l. $TiO_2$ and 25 g./l. HCl.

In Examples II to XVI the precedure is as in Example I, except for the difference in stabilizer.

Example XVII

Titanium hydrate is precipitated from a pure titanium tetrachloride liquor with a sodium carbonate solution at a pH of 7.5. The resulting hydrate is washed until the filtrate shows no chlorides. The washed hydrate is then peptized with HCl to form a sol containing 45 g./l. $TiO_2$ and 27 g./l. HCl. To this sol is added benzoic acid equal to 3.5% by weight of the $TiO_2$ content and then cured by heating to 70° C. to boiling, preferably to 90° C. in 15 minutes, and holding at this temperature for 10 minutes to develop the nuclear properties, and then immediately cooling below 60° C., preferably below 50° C.

Example XVIII

To a pure titanium chloride solution containing 45 g./l. $TiO_2$ and 45 g./l. HCl is added alanine equal to 3% by weight of the $TiO_2$ content and then cured by heating to 70° C. to boiling, preferably to 90° C. in 15 minutes to develop the nuclear properties, and then immediately cooling below 60° C., preferably below 50° C.

In Examples I to XVII, the $TiO_2$ in the sol before the heating and development of nuclear properties exists as orthotitanic acid which is soluble in dilute acids, but the heating effects "curing" of the seed and the $TiO_2$ takes the form of metatitanic acid which is insoluble in dilute acids. The seeds remain stable for weeks and months.

When these seeds are coagulated with ammonia solution, then washed free of $NH_4Cl$ and heated, complete conversion to rutile take place in most cases as low as 400° C., there being practically no need in any case to calcine at higher than 600° C. to effect 100% rutilization. Numerous tests and experiments also show that seeds, which rutilize at low temperature, exert corresponding effect on anatase hydrolysate that is produced by hydrolysis with such seeds, so that, on calcination, complete rutilization of such anatase hydrolysate occurs at 800–950° C., and most of the conversion to rutile taking place substantially below 950° C. Since the pigment properties of $TiO_2$ are greatly improved when the rutilization is at low temperature, the employment of my new seeds in the hydrolysis of titanium sulfate solutions produces an acid cake which on calcination yields $TiO_2$ pigment of superior color, tint and other highly-prized pigment qualities.

HCl is the preferred dispersing medium in the preparation of the sols, the molar ratio of HCl to $TiO_2$ being from about 1 to 2.2.

The amount of stabilizer should generally not exceed 80 millimols of stabilizer per mol of $TiO_2$, in order to form stable seed and the minimum amount of stabilizer is 3 millimols of stabilizer per mol of $TiO_2$. For most practical purposes, the quantity of stabilizer is preferred in the range of 20–30 millimols of stabilizer per mol of $TiO_2$. When the HCl concentration in the dispersion to be stabilized is low, e. g. 20 g./l., it is preferable to use 3–30 millimols of stabilizer per mol of $TiO_2$. On the contrary, where the HCl concentration in the dispersion to be stabilized is high, e. g. 60–70 g./l., it is preferable to employ 30–80 millimols of stabilizer per mol of $TiO_2$.

The term "stabilize" and its derivatives are used to denote the prevention of secondary agglomeration of the cured seed after the primary growth thereof has been arrested by cooling, with consequent impartation to the dispersed titanium hydrate seed of the property of maintaining practically its entire activity, potency and efficiency as a seed for prolonged period of time after stabilization, as distinguished from the relatively short period of effectiveness of the dispersed titanium hydrate seed before stabilization. It is the specific phenomenon of preventing the submicscropic crystal seeds from growing together into microscopic and macroscopic crystal seeds.

The expression "cure" and its derivatives are used to denote the conversion of orthotitanic acid sols prepared with monobasic acid, which sols are soluble in dilute acids, as well as other compounds of titanium and monobasic acid, which compounds are soluble in dilute acids, into sols of metatitanic acid which is insoluble in dilute acids.

The term "dispersion" is used herein to designate solutions and colloidal solutions.

This application is a continuation-in-part of my application Serial No. 516,212, filed December 30, 1943, now matured into U. S. Patent 2,480,869, my application Serial No. 516,213, filed December 30, 1943, now matured into U. S. Patent 2,444,940, and my application Serial No. 2,560, filed January 15, 1948, now matured into U. S. Patent 2,444,939.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A stabilized heat-cured rutile inducing seed comprising a colloidal solution of nuclei of a titanium dioxide in HCl and stabilized with a monobasic organic carboxylic acid which is soluble in dilute HCl, said monobasic organic carboxylic acid being 3–80 millimols per mol of $TiO_2$ and the molar ratio of HCl to $TiO_2$ being from about 1 to 2.2.

2. The seed claimed in claim 1, wherein the titanium dioxide is 20 to 90 grams per liter.

3. A stabilized heat-cured rutile inducing seed comprising a colloidal solution of nuclei of a titanium dioxide in HCl and stabilized with a monobasic organic carboxylic acid, which is soluble in dilute HCl, said monobasic organic carboxylic acid being 20–30 millimols per mol of $TiO_2$ and the molar ratio of HCl to $TiO_2$ being from about 1 to 2.2.

4. A stabilized heat-cured rutile inducing seed comprising a colloidal solution of nuclei of a titanium dioxide in HCl and stabilized with a monobasic organic carboxylic acid which is soluble in dilute HCl, said monobasic organic carboxylic acid being 4–30 millimols per mol of $TiO_2$ and the molar ratio of HCl to $TiO_2$ being from about 1 to 2.2.

5. A stabilized heat-cured rutile inducing seed comprising a colloidal solution of nuclei of a titanium dioxide in HCl and stabilized with a monobasic organic carboxylic acid which is soluble in dilute HCl, said monobasic organic carboxylic acid being 20–50 millimols per mol of $TiO_2$ and the molar ratio of HCl to $TiO_2$ being from about 1 to 2.2.

6. In a process of making a rutile inducing seed for use in hydrolysis of hydrolyzable titanium salt solutions, heating at a temperature from 70° C. to boiling a system containing a stabilizer comprising a monobasic organic carboxylic acid which is soluble in HCl and a member of the class consisting of the chlorides of titanium and the orthohydrate of titanium peptized with HCl, the HCl being from about 1 to 2.2 mols per mol of $TiO_2$ and the monobasic organic carboxylic acid being 3–80 millimols per mol of $TiO_2$, said heating being carried out until curing is effected, and then rapidly cooling below 60° C.

7. The process claimed in claim 6, wherein the titanium dioxide is 20 to 90 grams per liter.

8. In a process of making a rutile inducing seed for use in hydrolysis of hydrolyzable titanium salt solutions, heating at a temperature from 70° C. to boiling a system containing a stabilizer comprising a monobasic organic carboxylic acid which is soluble in HCl and the orthohydrate of titanium peptized with HCl, the HCl being from about 1 to 2.2 mols per mol of $TiO_2$ and the monobasic organic carboxylic acid being 3–80 millimols per mol of $TiO_2$, said heating being carried out until curing is effected, and then rapidly cooling below 60° C.

9. The process claimed in claim 8, wherein the titanium dioxide is 20 to 90 grams per liter.

10. In a process of making a rutile inducing seed for use in hydrolysis of hydrolyzable titanium salt solutions, heating at a temperature from 70° C. to boiling a system containing a stabilizer comprising a monobasic organic carboxylic acid which is soluble in HCl and a chloride of titanium, the monobasic organic carboxylic acid being 3–80 millimols per mol of $TiO_2$, said heating being carried out until curing is effected, and then rapidly cooling below 60° C.

11. The process claimed in claim 10 wherein the titanium dioxide is 20 to 90 grams per liter.

MAX J. MAYER.

REFERENCES CITED

The following references are of record in the file of this patent:

UNITED STATES PATENTS

| Number | Name | Date |
|---|---|---|
| 2,444,939 | Mayer | July 13, 1948 |
| 2,444,940 | Mayer | July 13, 1948 |
| 2,480,869 | Mayer | Sept. 6, 1949 |
| 2,488,755 | Aagard | Nov. 22, 1949 |